J. O. JOHNSTON.
STUMP PULLER.
APPLICATION FILED SEPT. 10, 1912.

1,062,470.

Patented May 20, 1913.

2 SHEETS—SHEET 1.

Witnesses:
Christ Feinle, Jr.
E. Edwards

Inventor,
James O. Johnston.
By Victor J. Evans,
Attorney.

COLUMBIA PLANOGRAPH CO., WASHINGTON, D. C.

J. O. JOHNSTON.
STUMP PULLER.
APPLICATION FILED SEPT. 10, 1912.

1,062,470.

Patented May 20, 1913.

2 SHEETS—SHEET 2.

Witnesses:
Christ Feinle, Jr.
C. Edwards

Inventor,
James O. Johnston.
By Victor J. Evans,
Attorney.

UNITED STATES PATENT OFFICE.

JAMES O. JOHNSTON, OF ATHOL, IDAHO.

STUMP-PULLER.

1,062,470.  Specification of Letters Patent.  Patented May 20, 1913.

Application filed September 10, 1912. Serial No. 719,599.

*To all whom it may concern:*

Be it known that I, JAMES O. JOHNSTON, a citizen of the United States, residing at Athol, in the county of Kootenai and State of Idaho, have invented new and useful Improvements in Stump-Pullers, of which the following is a specification.

This invention relates to stump pullers and one of the principal objects of the invention is to secure a great leverage with a minimum amount of power.

Further objects of this invention will appear as the following specific description is read in connection with the accompanying drawings, which forms a part of this application, and in which:—

Figure 1:
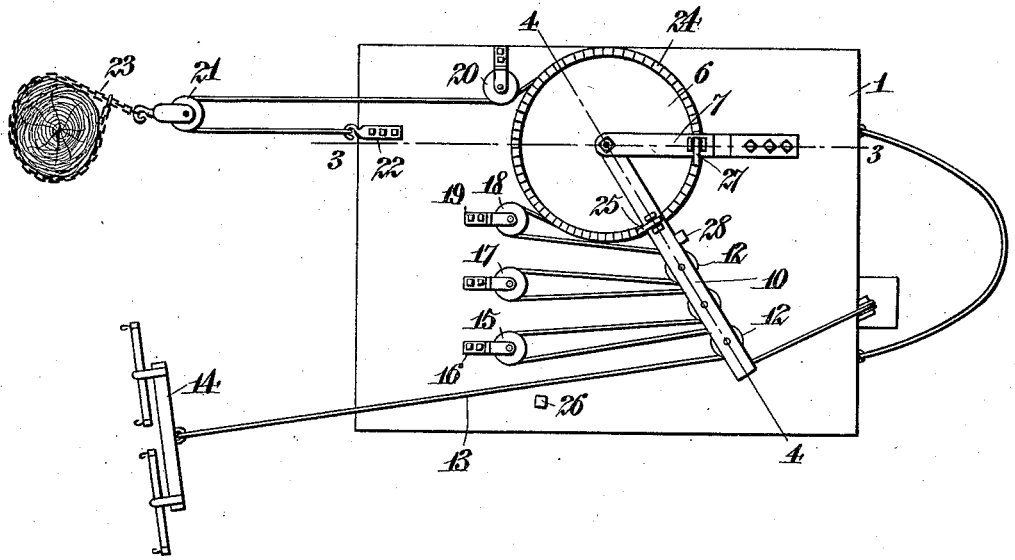
Figure 2:
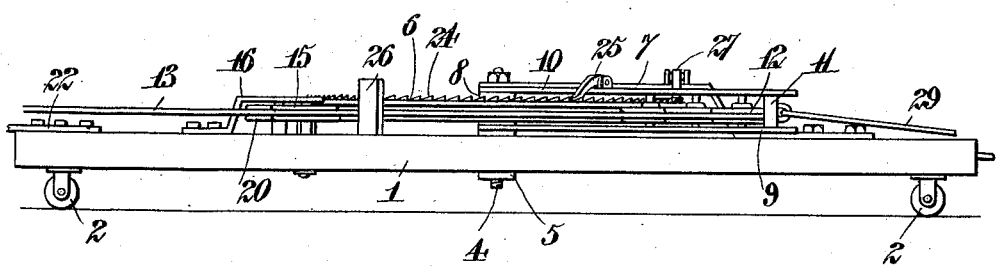
Figure 3:
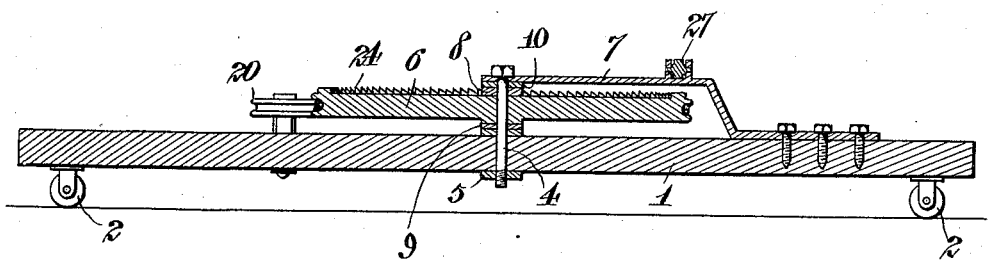
Figure 4:
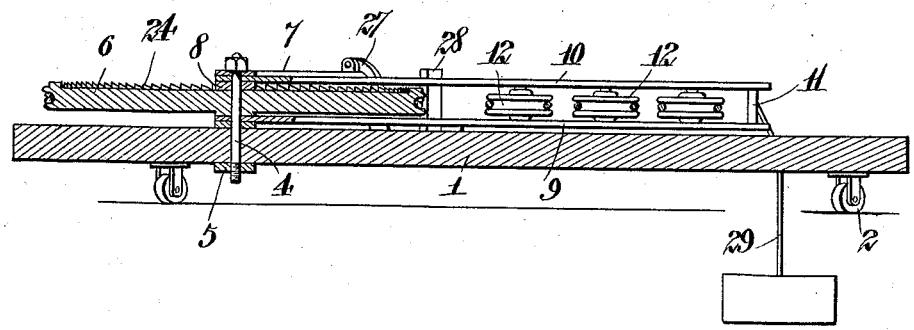

Figure 1 is a top plan view. Fig. 2 is a side elevation. Fig. 3 is a longitudinal sectional view on the line 3—3 of Fig. 1. Fig. 4 is a sectional view on the line 4—4 of Fig. 1.

Referring more particularly to the drawings, 1 represents a platform or frame which is mounted upon caster wheels 2 so as to be readily moved from point to point to permit the same to be swung around an arc from an anchor stump. At one end of the frame is secured a king bolt or stub shaft 4 having a bearing plate 5 mounted thereon so as to receive the wear of the cable drum 6 journaled upon the king bolt, as shown. The upper end of the king bolt is connected to the frame by a brace 7 and between the same and the drum is a washer 8 adapted to take the upward thrust of the drum, as will be readily understood. Journaled on the king bolt on opposite sides of the drum are separated sweep arms 9 and 10 which are connected together at their outer ends by a bridge piece 11 and which have journaled therebetween suitable cable pulleys 12 adapted to receive the cable 13. The free end of the cable has secured thereto a suitable double tree or other drafting device, as shown at 14. From the free end of the cable, the same passes over the outermost pulley on the sweep arm, then over a stationary pulley 15 journaled in the bracket 16 on the frame. From there, the cable passes over the intermediate pulley on the sweep arm and over a similar pulley 17 mounted on the frame similar to the pulley 15. From thence the cable passes over the inner pulley of the sweep arm and over a pulley 18 journaled in the bracket 19 on the arm, the cable then passes around the drum one or more times and over a pulley 20 to a snatch block 21 and has its opposite end connected to a hook 22 carried by the frame. The snatch block is preferably connected to a stump grapple, here connected as a chain 23 which surrounds the stump, as shown in Fig. 1.

The outer face of the drum is provided with an annular ratchet surface 24 which is engaged by a bolt or dog 25 carried by the sweep arm 9 so as to rotate the drum when the sweep arm is drawn toward the limiting stop 26. The drum is held against retrograde movement by means of a similar dog 27 pivoted to the brace 7. This dog holds the drum against retrograde movement while the sweep arm is returning to its normal position against the stop 28. The sweep arm is preferably returned to normal position by means of a weighted cable 29 which passes over a pulley 30 carried by the frame.

In the operation of the device, the cable 3 is connected to the anchor stump in any suitable manner and the grapple 23 to the stump to be pulled. A team is then hitched to the draft device 14 and the cable drawn up, as will be readily understood. As the free end of the cable is moved forward, the same will travel over the pulleys 12, 15, 17 and 18, and draw the sweep arm from its initial position against the stop 28 to the position shown in dotted lines in Fig. 1 against the stop 26. At the same time, the sweep arm will rotate the drum 24 and drawing the cable over the snatch block 21, will pull the stump from its mooring. If it is necessary to make a second movement, the team is unhitched and the cable slacked until the weighted cable 29 has pulled the sweep arm back to normal position. The operation is then repeated as before.

What is claimed is:—

1. In a stump puller, a frame, wheels for supporting the frame, a drum journaled on the frame, a sweep pivoted to the frame and carrying pulleys, pulleys on the frame, a cable passing over the pulleys, on the frame and sweep, and over the drum, means carried by the sweep for actuating the drum in one direction, means for preventing retrograde movement of the drum, and means for connecting the cable to a stump to be pulled.

2. In a stump puller, a frame, wheels for supporting the same, a drum journaled on the frame and having a ratchet face, a sweep pivoted on the frame and carrying pulleys, pulleys on the frame, a cable passing over the pulleys on the frame and sweep and over said drum, means for connecting the cable to the stump to be pulled, a pawl carried by the sweep for actuating the drum in one direction, means for preventing retrograde movement of the drum, and means for returning the sweep to normal position when the cable is released.

In testimony whereof I affix my signature in presence of two witnesses.

JAMES O. JOHNSTON.

Witnesses:
WM. O. LEWIS,
RUTH L. LEWIS.

Copies of this patent may be obtained for five cents each, by addressing the "Commissioner of Patents, Washington, D. C."